United States Patent [19]
Brunet

[11] Patent Number: 6,058,791
[45] Date of Patent: May 9, 2000

[54] ACCESSORY MECHANICAL DRIVE FOR A GAS TURBINE ENGINE

[75] Inventor: Allyn T. Brunet, Phoenix, Ariz.

[73] Assignee: AlliedSignal, Inc., Morris Township, N.J.

[21] Appl. No.: 09/044,471

[22] Filed: Mar. 19, 1998

[51] Int. Cl.$^7$ .............................. F16C 3/03; F16D 11/04; F16H 37/00
[52] U.S. Cl. ............................ 74/15.63; 74/405; 74/417; 192/69.9; 464/169
[58] Field of Search .................................. 74/15.63, 405, 74/665 GB, 417; 192/69.9; 464/169

[56] References Cited

U.S. PATENT DOCUMENTS

| | | | |
|---|---|---|---|
| 2,468,182 | 4/1949 | Dempsey | 464/169 |
| 2,978,869 | 4/1961 | Hiscock et al. | |
| 3,269,118 | 8/1966 | Benedict et al. | |
| 3,543,588 | 12/1970 | Richardson | |
| 3,631,735 | 1/1972 | McCarty | 74/405 |
| 3,688,560 | 9/1972 | Broman et al. | |
| 3,792,586 | 2/1974 | Kasmarik et al. | |
| 3,799,476 | 3/1974 | Bouiller et al. | |
| 3,907,386 | 9/1975 | Kasmarik et al. | |
| 4,566,269 | 1/1986 | Gingras | |
| 5,098,343 | 3/1992 | Tysver et al. | |
| 5,195,401 | 3/1993 | Mouton | |
| 5,261,801 | 11/1993 | Stone | |

FOREIGN PATENT DOCUMENTS 44 46 689   6/1995   Germany.

*Primary Examiner*—Allan D. Herrmann
*Attorney, Agent, or Firm*—Robert Desmond, Esq.

[57] ABSTRACT

An accessory gear drive for gas turbine engine utilizes a radially extending, floating tower shaft which is unrestrained against radial movement, but includes a resilient biasing means for normally holding the tower shaft in power driving interengagement between the central drive shaft of the engine and an external accessory gear box. For engine maintenance, the tower shaft may be readily accessed and shifted radially outwardly by compressing the biasing means in order to facilitate easy engine disassembly and assembly.

15 Claims, 4 Drawing Sheets

ACCESSORY MECHANICAL DRIVE FOR A GAS TURBINE ENGINE

BACKGROUND OF THE INVENTION

1. Field of the Invention

This invention pertains to gas turbine engines and pertains more particularly to an improved accessory mechanical drive for transmitting mechanical power radially outwardly from the gas turbine drive shaft to an accessory gear box.

2. Description of the Prior Art

Gas turbine engines typically include an accessory gear box normally mounted in its own casing at the exterior of the gas turbine engine casing. The gear box is mechanically interconnected for transmittal of motive power to a primary central drive shaft of the engine. Normally, starting power for the gas turbine engine is delivered from the accessory gear box through an accessory mechanical drive to rotate the central drive shaft. Then during normal engine operation, power is transmitted from the central drive shaft to the accessory gear box for driving hydraulic, electrical and pneumatic components for generating accessory power. It is necessary that such an accessory mechanical drive operate at extremely high speeds, e.g. 20,000 to 40,000 rpm. Accordingly, it is important that the shafting of the accessory mechanical drive, often referred to as a tower shaft, be of minimum weight and maximum stiffness to avoid critical speed problems.

Economies of operation of a gas turbine engine are also reflected in the simplicity and ease of assembly/disassembly for maintenance purposes. However, in many gas turbines the removal of the accessory mechanical drive requires full disassembly or removal of the accessory gear box.

Various arrangements have been contemplated in the prior art to provide an accessory mechanical drive which may be disassembled without removal of the accessory gear box. These arrangements are replete with operational problems due to the very high speed of operation thereof. For example, arrangements of the prior art include multiple-piece, telescoping tower shafts for the mechanical drive for the purpose of simplifying maintenance. Other arrangements include multiple-piece tower shafting wherein there is adequate space within the gas turbine engine for access to the midspan portion of the tower shaft. Other arrangements contemplated by the prior art have included arrangements of threaded sleeves associated with the accessory mechanical drive tower shaft to allow radial displacement thereof during engine assembly/disassembly. Other methods have contemplated inclusion of bolts with self locking threads which may be accessed to assist in removal of the tower shaft.

A common problem with all known prior art arrangements is that each adds complexity and weight to the tower shaft which is rotating at very high speeds. This impacts the weight and stiffness thereof. Drive joints, introduction of more rotating mass with the tower shaft, bolts, or threaded sleeves—all are arrangements which distract from the basic requirements of the tower shaft of minimum weight and maximum stiffness.

Characteristically the prior art arrangements physically lock the tower shaft of the accessory gear drive against radial movement. In some arrangements the tower shaft is physically secured to the drive train associated with the central drive shaft, or secured with the drive train associated with the accessory gear box. In some arrangements, the tower shaft is secured against radial movement by physically locking it to the engine casing through an appropriate bearing arrangement. Such securement of the tower shaft against radial movement either dramatically complicates engine assembly/disassembly, or adds to the weight of the rotating components associated with the tower shaft, or does both.

SUMMARY OF THE PRESENT INVENTION

It is an important object of the present invention to provide an improved tower shaft for an accessory mechanical drive in a gas turbine engine, wherein the tower shaft is of minimum weight and maximum stiffness, yet can be readily disassembled during engine maintenance without disturbing or entering the accessory gear box.

Another important object of the present invention is to provide an accessory mechanical drive for a gas turbine engine wherein the primary tower shaft for transmitting power between the accessory gear box and the main drive shaft of the gas turbine engine is not physically locked against radial movement, and is freely radially movable. Further, the invention contemplates such a freely radially movable or floating tower shaft whose radial motion is limited by abutments associated with the gear drives, one of these abutments being readily radially movable against a resilient biasing member to facilitate engine assembly/disassembly.

More particularly the present invention contemplates an accessory gear drive for transmitting power between the gas turbine engine central drive shaft and an accessory gear box disposed radially outwardly of the drive shaft. The arrangement included a unitary, floating tower shaft, preferably splined at both ends, that extends radially between the central drive shaft and the external gear box. First and second gear means respectively driving interconnect the tower shaft with the drive shaft and the accessory gear box. A resilient biasing means is carried with the second gear means for holding the tower shaft in engagement with the first gear means during normal engine operation; yet during engine disassembly the tower shaft may be readily radially displaced outwardly by engaging and compressing the resilient biasing means without requiring removal or other disturbance of the accessory gear box.

These and other objects and advantages of the present invention are specifically set forth in or will become apparent from the following detailed description of the invention when read in conjunction with the accompanying drawings.

DETAILED DESCRIPTION OF THE INVENTION

Figure 1:
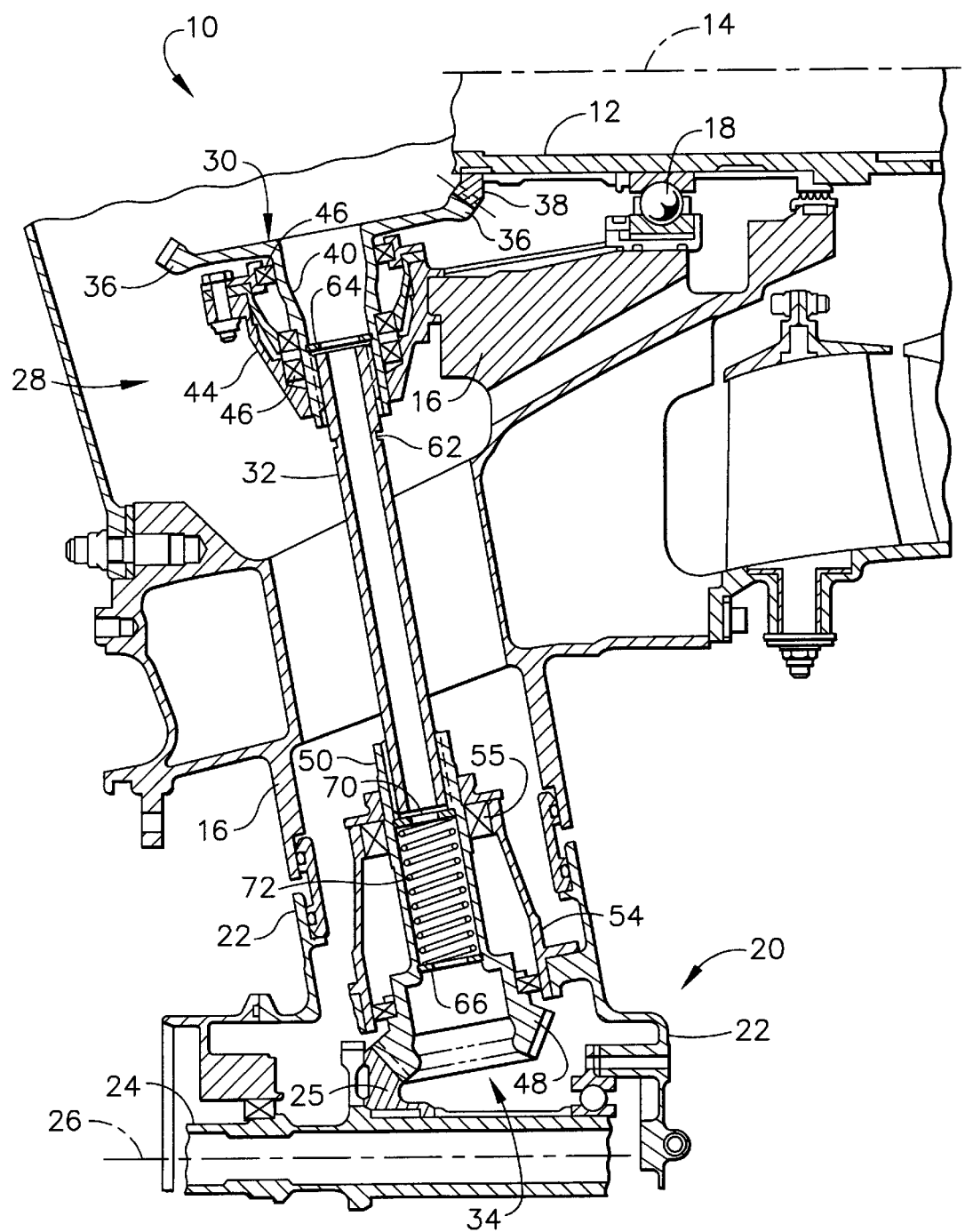
FIG. 1 is a partial elevational cross sectional view of a gas turbine engine incorporating the present invention, and depicted in its normal operating mode.

Referring now more particularly to the drawings, a gas turbine engine generally denoted by the numeral 10 includes a primary centrally located power drive shaft 12 rotatable about the central axis 14 of the engine. The shaft 14 is rotatably mounted within a stationary casing 16 of the engine through a plurality of bearings such as bearing 18. The engine includes an accessory gear box generally denoted by the numeral 20 which has its own accessory gear box casing 22 secured externally to the engine casing 16. Rotatably carried within the casing of the accessory gear box is a primary accessory drive shaft 24 which, in the preferred arrangement illustrated, is rotatable about an axis 26 extending generally parallel to the central drive axis 14 of the gas turbine engine.

Extending radially outwardly from the central drive shaft 12 of the engine to the accessory gear box 20 is an improved accessory mechanical drive of the present invention generally denoted by numeral 28. The mechanical drive 28 generally includes a first gear means 30 in driving interengagement with shaft 12, a radially outwardly extending tower shaft 32, and a second gear means generally denoted by the numeral 34 which is in driving interengagement with the accessory gear box drive shaft 24.

First gear means 30 includes a bevel gear 36 with teeth in mating interengagement with a pinion 38 secured to and rotating with engine drive shaft 12. First gear means 30 further includes a hollowed, radially outwardly extending cylindrical shaft 40 whose radial outer end is configured with an internal spline with longitudinal spline teeth 42. The first gear means 30 further includes a stationary carrier 44 secured by means not shown to the engine casing 16. Shaft 40 is appropriately rotatably carried within carrier 44 via bearings 46.

The second gear means 34 includes a bevel pinion 48 with teeth in mating interengagement with a bevel gear 25 secured to the accessory gear box drive shaft 24. Extending radially inwardly from the bevel gear 48 is a hollowed cylindrical shaft 50 having a radial inner end configured with longitudinal spline teeth 52. The second gear means 34 is rotatably carried within a gear carrier 54 by appropriate bearings 55. Gear carrier 54 is secured to accessory gear box casing 22 by conventional attachment means not shown.

Tower shaft 32 is comprised of a longitudinal, unitary, hollowed shaft extending radially between the first gear means 30 and the second gear means 34. The opposite ends of tower shaft 32 are configured with external spline teeth 58 and 60. Spline 58 is in mating interengagement with spline 42 of the first gear means 30, and spline teeth 60 are in mating interengagement with the spline teeth 52 of the second gear means 34. Near its radially inner end, tower shaft 32 may be configured with a groove 62 to facilitate grasping thereof during assembly/disassembly as discussed in greater detail below.

It is important to note that tower shaft 32 is of unitary construction, without any intermediate drive joints. Further, tower shaft 32 is unrestrained against radial movement. That is, floating tower shaft 32 is readily shiftable or slidable in a radial direction upon the associated splines 42, 52 of the first and second gear means. This arrangement assures maximum stiffness and minimum weight of tower shaft 32, factors critically important in operation of the tower shaft at very high rotational speeds.

While floating tower shaft 32 is freely movable in a radial direction, its radial travel is limited by abutments associated with the first and second gear means 30, 34. To this end the first gear means includes a first abutment or stop 64 which may be in a form of a pressed-in plug carried within an associated groove in shaft 40. Plug 64 is engageable with the inner traverse end of tower shaft 32 to limit radial inward travel of the tower shaft. The second gear means 34 includes a second fixed abutment 66 which may be in the form of a pressed-in plug carried within an associated groove of the shaft 50. In opposing relation to the second abutment 66 is a third abutment 68 carried in the second gear means 34. In the preferred arrangement illustrated, the radially outer transverse face of the spline teeth 52 constitutes the third fixed abutment 68.

Importantly, the present invention further contemplates a fourth movable abutment 70 associated with the second gear means 34. In the preferred arrangement illustrated, the fourth movable abutment 70 comprises a spring retainer washer. Extending between movable fourth abutment 70 and the second fixed abutment 66 is a resilient biasing means in the form of a preloaded compression coil spring 72. Coil spring 72 normally biases the movable fourth abutment 70 radially inwardly into engagement with the third fixed abutment 68 at a location just slightly spaced from the radial outer end 74 of tower shaft 32. Thus, in normal operation, the fourth movable abutment 70 acts to limit radial outward travel of the freely movable tower shaft 32 by engagement of its radial outer end 74 with the movable fourth abutment 70.

Figure 3:
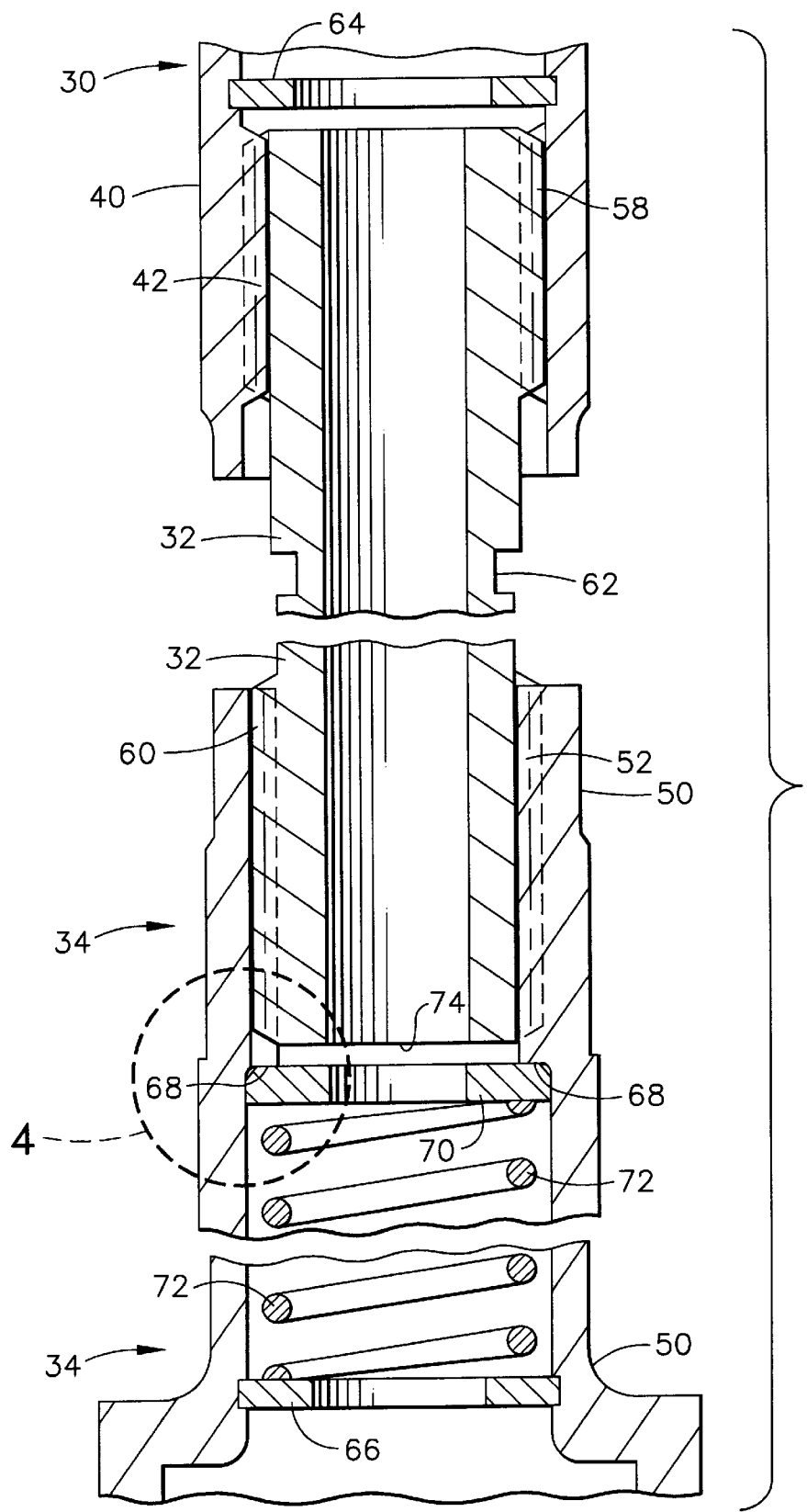
FIG. 3 is an enlarged, partial, elevational cross sectional view of the improved tower shaft arrangement of the present invention.
Figure 4:
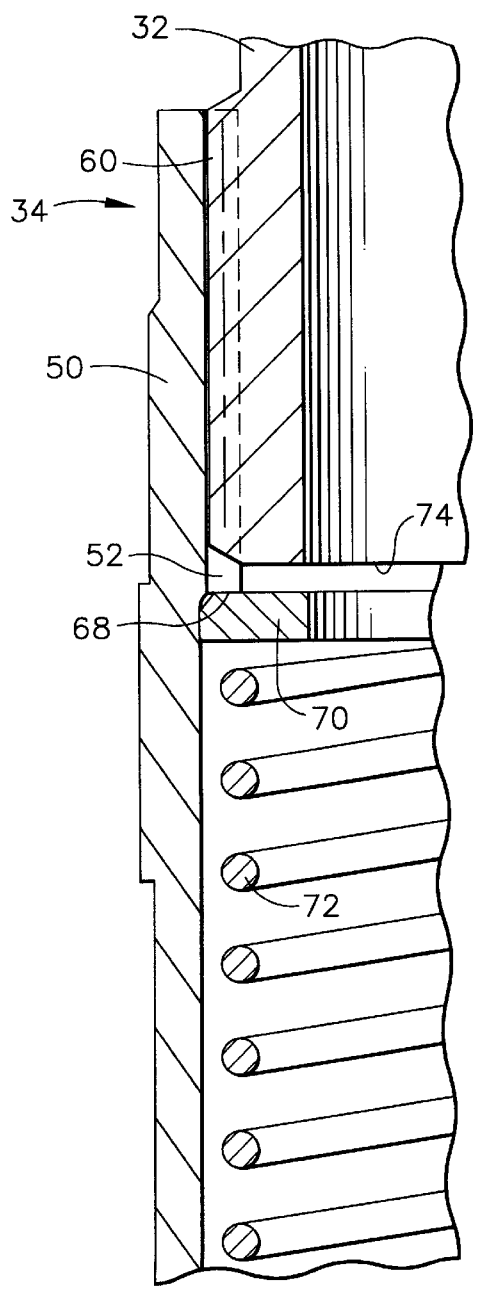
FIG. 4 is yet a further enlarged, fragmentary view of the area denoted within the circle of lines 4—4 of FIG. 3.

In normal operation of the gas turbine engine, the tower shaft 32 is in driving interengagement between the first and second gear means 30 and 34. This position of the tower shaft 32 is illustrated in FIGS. 1, 3, and 4. During engine start up, mechanical power from the accessory gear drive shaft 26 is transmitted through the second gear means 34, tower shaft 32, first gear means 30, the bevel gear 36 and pinion 38 to rotate the primary drive shaft 14. After starting of the engine and during the engine's continuing operation, accessory power is derived from shaft 14 through the accessory gear drive 28 in a radially outward direction through the first gear means 30, tower shaft 32 and second gear means 34 to drive the accessory gear box shaft 26 in conventional fashion. As noted previously, tower shaft 32 is unrestrained against radial motion during such normal engine operation, though the radial movement of the tower shaft is limited by the first fixed abutment 64 and the fourth movable abutment 70. Since the tower shaft 32 must transmit torque both radially inwardly and radially outwardly, it is of necessity subject to a certain amount of radial thrust in transmitting such torque. Accordingly, the compressible coil spring 72 is configured such that its radially inward preload is greater than any radial outward thrust experienced by tower shaft 32. In this manner, tower shaft 32 is retained or held in driving interengagement since the thrust of tower shaft 32 is inadequate to compress spring 72. In certain design applications, if the radially outward thrust experienced by tower shaft 32 is relatively extreme to the extent that load on spring 72 is greater than the desired spring preload, then the mating splines 42, 58 and or splines 52, 60 may be manufactured with a slight helical configuration to counteract the radial outward thrust on tower shaft 32. Use of helical configuration of the splines may be utilized to reduce the required preload on compression spring 72 to maintain the tower shaft 32 in its normal operating position illustrated in FIGS. 1, 3 and 4.

Figure 2:
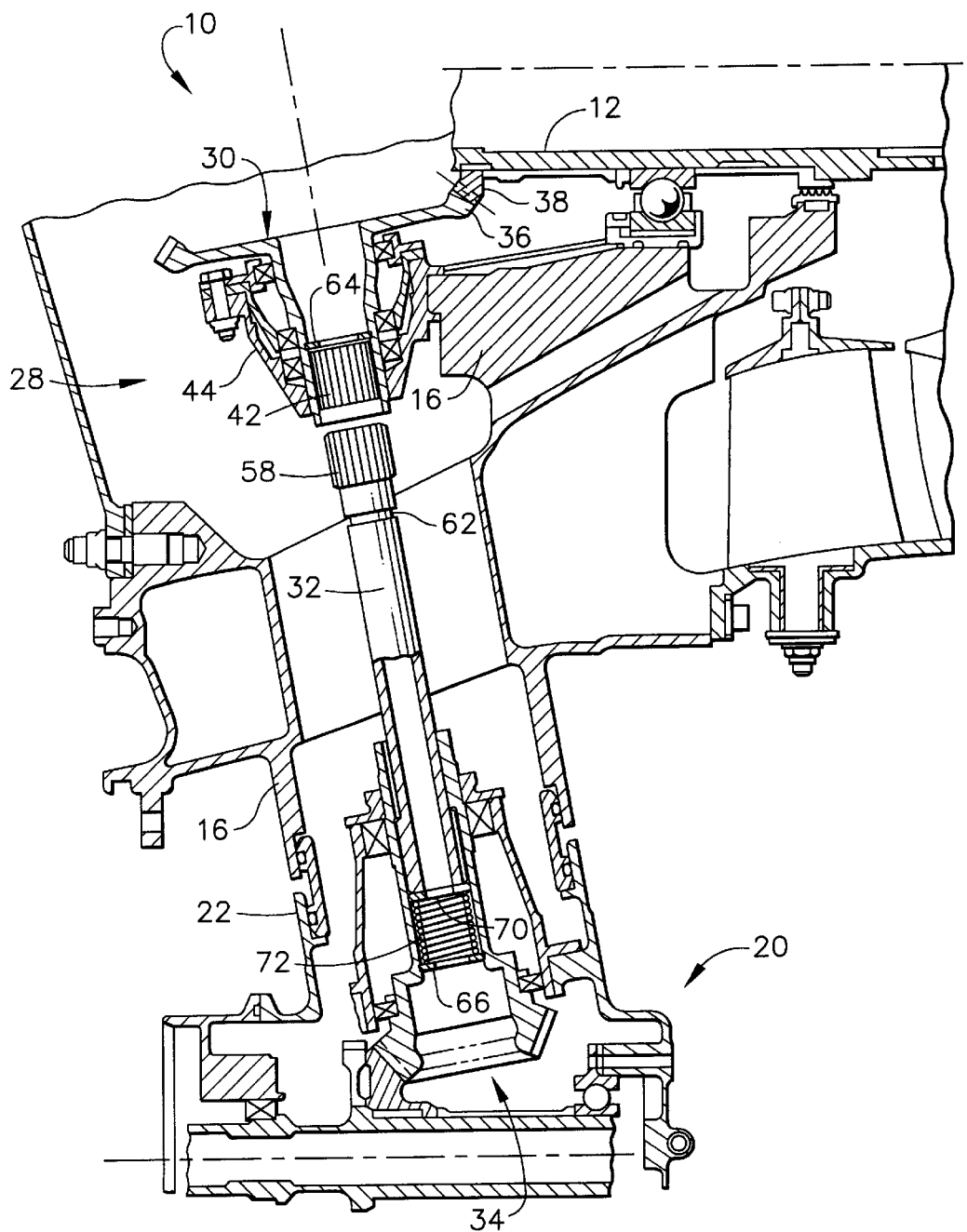
FIG. 2 is a view similar to FIG. 1 but showing the tower shaft displaced out of engagement with the central drive shaft during engine assembly/disassembly.
Figure 5:
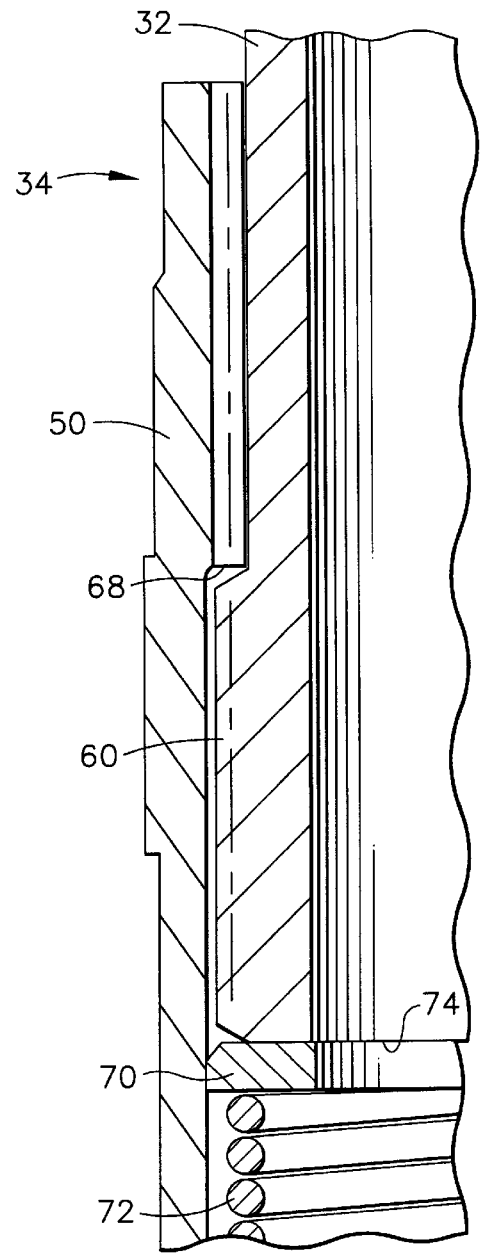
FIG. 5 is a view similar to FIG. 4 but showing the tower shaft displaced out of driving engagement for disassembly purposes.

During engine maintenance, it is sometimes desirable to remove the first gear means 30 for repair or replacement purposes. To this end the present invention allows the first gear means 30 to be removed from the engine without disturbing the accessory gear box 20. More particularly, during engine maintenance, the front cavity of the engine outboard of gear housing 44 is normally accessed after removal of the engine fan (not shown). Through this central part of the engine the tower shaft 32 may be grasped, such as at notch 62 and readily radially shifted outwardly against the preloaded spring 72 to the position illustrated in FIG. 2 and FIG. 5. In this position the spline 58 of the tower shaft 32 has cleared the mating spline end 42 of the first gear means 30. Once so disconnected from the tower shaft 32, the first gear means 30 may be readily removed through the central part of the engine by the detachment of its gear carrier 44 from the engine casing 16. FIG. 5 clearly illustrates that the radially outward shifting of tower shaft 32 has brought its radial outer end 74 into engagement with movable fourth abutment 70 and shifted the latter radially outwardly in a manner compressing the coil spring 72. Upon reassembly, of course, the holding force on tower shaft 32 may be released and the spring 72 promptly urges the tower shaft radially inwardly with the splines 58 matingly reengaging the splines 42 of the first gear means 30. Thus, the present invention provides a simple, economical manner of facilitating engine assembly and disassembly without compromising the stiffness and weight attributes of the high speed tower shaft 32.

Returning to a description of normal engine operation as depicted in FIGS. 1,3 and 4, it is important to note that the fourth movable abutment 70 is in engagement with the third fixed abutment 68 associated with the second gear means. The spring 72, as noted, is in a preloaded condition urging abutment 70 into engagement with abutment 68. Importantly, this arrangement prevents the imposition of stress cycling upon the coil spring 72 during normal engine operation. For this reason, it is preferable that the fourth movable abutment engage the fixed abutment 68 so that the spring 72 is held in static position during normal engine operation.

The present invention offers further advantages in instances of engine failure. More particularly, in the event of breakage or failure of the compression spring 72, the compression spring 72 may slightly reduce in length when coiled. However, the adjacent broken coils will promptly reengage with one another and therefore still be functional to hold the floating tower shaft 32 in interengagement with the first and second drive means even though the tower shaft is not physically locked to either one.

From the foregoing it will be apparent that the present invention provides an accessory gear drive which may be readily assembled and disassembled for maintenance purposes without entry into or disturbing the accessory gear box 20. Yet the invention does not require midspan access to the tower shaft, nor radial access to the tower shaft as in many prior art arrangements. In this respect, it will be apparent that the pinion gear 48 of the second gear means 34 may be disposed immediately above the drive shaft 24 of the accessory gear box. This allows straddle mounting of the support bearings on accessory gear box gearshaft 26 which is the preferred arrangement.

Various modifications and alterations to the foregoing detailed description of preferred arrangements of the invention will be apparent to those skilled in the art. Accordingly, the foregoing should be considered as exemplary and not as limiting to the scope and spirit of the invention as set forth in the appended claims.

Having described the invention with sufficient clarity that those skilled in the art may make and use it, what is claimed is:

1. A gas turbine engine comprising:
    a central drive shaft;
    an accessory gear box disposed radially outwardly of the drive shaft;
    a unitary tower shaft extending radially between the drive shaft and the accessory gear box;
    first gear means for drivingly interengaging the drive shaft and the tower shaft;
    second gear means for drivingly interengaging the tower shaft and the accessory gear box; and
    resilient biasing means carried with said second gear means for radially urging the tower shaft into engagement with the first gear means during engine operation, said biasing means being compressible to permit radially outward shifting of the tower shaft out of engagement with the first gear means during engine disassembly without disturbing the accessory gear box.

2. A gas turbine engine as set forth in claim 1, wherein the tower shaft is arranged for free radial movement relative to the first and second gear means.

3. A gas turbine engine as set forth in claim 1, further including a first fixed abutment on the first gear means for limiting radial inward movement of the tower shaft.

4. A gas turbine engine as set forth in claim 3, further including second and third fixed abutments on the second gear means, said biasing means engaging said second and third abutments during normal engine operation to prevent stress cycling of said biasing means.

5. A gas turbine engine as set forth in claim 4, further including a fourth abutment at one end of said biasing means and radially movable therewith, said fourth abutment engaging said third abutment during normal engine operation, the tower shaft engaging said fourth abutment and compressing said biasing means to move said fourth abutment out of engagement with said third abutment upon said radially outward shifting of the tower shaft.

6. A gas turbine engine as set forth in claim 5, wherein the tower shaft is arranged for free radial movement relative to the first and second gear means.

7. A gas turbine engine as set forth in claim 6, wherein the tower shaft includes external splines at opposite ends thereof in mating engagement with complementary internal splines on the first and second gear means respectively.

8. A gas turbine engine as set forth in claim 6, wherein said resilient biasing means comprises a compressible coil spring.

9. A gas turbine engine as set forth in claim 2, wherein said resilient biasing means comprises a compressible coil spring.

10. An accessory mechanical drive for transmitting power between a central drive shaft of a gas turbine engine and an accessory gear box externally mounted to a casing of the engine, comprising:
    a unitary tower shaft extending radially between the drive shaft and the accessory gear box;
    first gear means for drivingly interengaging the drive shaft and the tower shaft;
    second gear means for drivingly interengaging the tower shaft and the accessory gear box; and
    resilient biasing means carried with said second gear means for radially holding the tower shaft in engagement with the first gear means during engine operation, said biasing means being compressible to permit radially outward shifting of the tower shaft out of engagement with the first gear means during engine disassembly without entry into the accessory gear box.

11. An accessory mechanical drive as set forth in claim 10, further including a first fixed abutment on the first gear means for limiting radial inward movement of the tower shaft.

12. An accessory mechanical drive as set forth in claim 11, further including second and third fixed abutments on the second gear means, said biasing means engaging said second and third abutments during normal engine operation to prevent stress cycling of said biasing means.

13. An accessory mechanical drive as set forth in claim 12, further including a fourth abutment at one end of said biasing means and radially movable therewith, said fourth abutment engaging said third abutment during normal engine operation, the tower shaft engaging said fourth abutment and compressing said biasing means to move said fourth abutment out of engagement with said third abutment upon said radial outward shifting of the tower shaft.

14. An accessory mechanical drive as set forth in claim 13, wherein the tower shaft is arranged for free radial movement relative to the first and second gear means.

15. An accessory mechanical drive as set forth in claim 10, wherein said resilient biasing means comprises a compressible coil spring.

* * * * *